United States Patent
Jung

(10) Patent No.: US 9,520,143 B2
(45) Date of Patent: Dec. 13, 2016

(54) FOREIGN LANGUAGE LEARNING APPARATUS AND METHOD FOR CORRECTING PRONUNCIATION THROUGH SENTENCE INPUT

(71) Applicant: WEAVERSMIND INC., Seoul (KR)

(72) Inventor: Sungeun Jung, Seoul (KR)

(73) Assignee: WEAVERSMIND INC., Seoul (KR)

( * ) Notice: Subject to any disclaimer, the term of this patent is extended or adjusted under 35 U.S.C. 154(b) by 454 days.

(21) Appl. No.: 14/087,209

(22) Filed: Nov. 22, 2013

(65) Prior Publication Data

US 2015/0134338 A1     May 14, 2015

(30) Foreign Application Priority Data

Nov. 13, 2013 (KR) .................. 10-2013-0137779

(51) Int. Cl.
G09B 19/06     (2006.01)
G10L 25/60     (2013.01)
G10L 13/00     (2006.01)

(52) U.S. Cl.
CPC .............. *G10L 25/60* (2013.01); *G09B 19/06* (2013.01); *G10L 13/00* (2013.01)

(58) Field of Classification Search
CPC ....................................................... G09B 19/06
USPC .......................................... 704/9, 260, 277
See application file for complete search history.

(56) References Cited

U.S. PATENT DOCUMENTS

| | | | |
|---|---|---|---|
| 7,292,980 B1* | 11/2007 | August | G10L 13/00 704/251 |
| 7,472,061 B1* | 12/2008 | Alewine | G10L 13/08 704/243 |
| 8,583,418 B2* | 11/2013 | Silverman | G10L 13/08 704/1 |
| 8,712,776 B2* | 4/2014 | Bellegarda | G10L 13/08 704/258 |
| 2002/0115044 A1* | 8/2002 | Shpiro | G09B 5/06 434/156 |
| 2006/0057545 A1* | 3/2006 | Mozer | G09B 5/06 434/156 |
| 2007/0009864 A1* | 1/2007 | Rikimaru | G09B 19/06 434/156 |
| 2008/0082316 A1* | 4/2008 | Tsui | G09B 5/00 704/4 |
| 2009/0319270 A1* | 12/2009 | Gross | G10L 17/26 704/246 |
| 2013/0132069 A1* | 5/2013 | Wouters | G06F 17/28 704/8 |

* cited by examiner

*Primary Examiner* — Michael N Opsasnick
(74) *Attorney, Agent, or Firm* — Lex IP Meister, PLLC

(57) ABSTRACT

A foreign language learning apparatus and method are provided. The foreign language learning apparatus includes a sentence input unit receiving a first sentence from a user; a linked letter detection unit detecting at least one letter corresponding to at least one linking rule; a linked letter removal unit removing the letter and generating a second sentence by inserting a linking code; a partial waveform generation unit generating one or more partial waveforms using the Text To Speech (TTS) engine; an input waveform generation unit converting a voice corresponding to the first sentence into an input waveform; and a matching degree calculation unit calculating a matching degree and a partial matching degree. This foreign language learning apparatus enables a user to effectively learn pronunciation of a foreign language.

18 Claims, 4 Drawing Sheets

① sentence input :
   This is a picture of a street.
② linked letter detection :
   This is a picture of street.
③ word waveform insertion :
   street.

④ linked letter removal :
   Thi_ _s a picture of a s_reet.
⑤ partial waveform generation :

FOREIGN LANGUAGE LEARNING APPARATUS AND METHOD FOR CORRECTING PRONUNCIATION THROUGH SENTENCE INPUT

CROSS REFERENCE

This application claims foreign priority under Paris Convention and 35 U.S.C. §119 to Korean Patent Application No. 10-2013-0137779, filed Nov. 13, 2013 with the Korean Intellectual Property Office.

BACKGROUND OF THE INVENTION

1. Field of the Invention

The present invention relates generally to a foreign language learning apparatus and method for correcting pronunciation through sentence input and, more particularly, to a foreign language learning apparatus and method for correcting pronunciation through sentence input, in which a waveform is disposed in accordance with a sentence input by a user and a matching percentage is calculated by matching a voice input by a user with the previously stored waveform or a waveform generated via a Text To Speech (TTS) engine.

2. Description of the Related Art

The present invention relates to a foreign language learning apparatus.

Recently, in line with the trend of the specialization and globalization of industry, the importance of learning a foreign language is increasing. In view of such importance, many people spend their time learning foreign languages, and thus various types of online and offline language learning courses have been established.

The importance of conversation in the field of the foreign language learning is further highlighted. In the case of English among foreign languages, TOEFL Test of Spoken English (TSE) was fully established in September of 2005. Accordingly, the demand for personal language learning materials and simulation test devices is increasing.

In general, pronunciation or the correction of pronunciation is performed using a 1:1 teaching method that involves a foreign lecturer. In such a case, problems arise in that high costs are required for English learning and the participation of people who lead a busy life, such as office workers, in the learning of English is very limited because education is performed according to specially arranged schedules.

Accordingly, there is a need for an education program which enables a user to effectively learn the pronunciation of a foreign language or pronunciation during his or her free time and to compare his or her pronunciation with a native speaker's pronunciation.

In order to meet the need, learning devices for language learning on which various programs for language learning using voice recognition have been installed have been developed and become popular.

A foreign language pronunciation evaluation method in such learning machines for language learning is based on a pronunciation comparison method using voice signal processing technology. In this method, programs for recognizing a learner's pronunciation using a Hidden Markov Model (hereinafter referred to as an "HMM"), comparing the learner's pronunciation with a native speaker's pronunciation, and providing notification of the results of the comparison are utilized.

In such a conventional foreign language pronunciation evaluation method, the accuracy of pronunciation is evaluated using a method of comparing one element characteristic of segmental characteristics for a learner's pronunciation with a corresponding characteristic of a native speaker. In particular, the phoneme characteristic data of the segmental characteristics is chiefly used.

The characteristic data of a native speaker uses characteristic data extracted via a trained Acoustic Model (AM) or from the native speaker's voice data when the native speaker pronounces expressions. However, disadvantages arise in that it is difficult to expect correct evaluation for the characteristic data extracted via the AM or from the voice because errors attributable to the personal pronunciation propensities of all native speakers are disregarded and the stress or isochronism of a syllable or sentence structure and a sentence cannot be evaluated or the accuracy of the evaluation cannot be expected even when the stress or isochronisms are evaluated.

Furthermore, the above-described pronunciation comparison and analysis programs are problematic in that they may not be used to evaluate individual characteristics, such the accent, stress, or pronunciation speed of a specific sentence or word, because the same or random weight is equally assigned to the segmental and non-segmental characteristics of all types of pronunciations.

Accordingly, most learning machines on which the programs have been installed receive a learner's voice corresponding to any one selected from among sentences displayed on a display device, and simply compare the received learner's voice with a native speaker's pronunciation and evaluate the results of the comparison using the programs, and provide the results of the evaluation to the learner in the form of scores.

Furthermore, a learner may be roughly aware of the degree of accuracy of his or her pronunciation indicated by the scores, but may not learn based on accurate comparison and analysis because there is no means for making a comparison on pronunciation for each field, such as each of the pronunciation length, accent, stress and pronunciation speed of a word or a sentence. As a result, a problem arises in that pronunciation correction is limited.

Furthermore, conventional language learning machines on which voice recognition programs or engines have been installed include only uniform evaluation criteria. Accordingly, conventional language learning machines are unable to enable learning suitable for the level or personality of a learner because the language ability or pronunciation characteristic of a learner are not appropriately reflected in the language learning machines. Furthermore, it is difficult to apply conventional voice recognizers to the AM of a foreign language native speaker, and a recognition ratio for the accuracy of pronunciation falls short of learners' expectations due to different pronunciation and language habits.

Furthermore, it is practically impossible to effectively distinguish minimal pairs, that is, an elementary learning target using conventional voice recognizers, it is impossible to effectively handle a noisy environment, and the detection performance of a keyword or core words and phrases is low or ineffective.

Furthermore, current language learning machines are problematic in that they cannot interpret and handle various language phenomena that may occur in actual conversation environments because the current language learning machines are focused on textbook learning methods.

Furthermore, conventional language learning machines are problematic in that they are expensive.

Accordingly, from a learner's viewpoint, the cost may be reduced if self-evaluation for pronunciation is performed using the Internet, but language learning systems using on-line methods, such as the Internet, are related to only English composition or conversations. Furthermore, there is no provision for a system for accurately evaluating a foreign language pronounced by a learner in various ways, providing notification of the differences between a learner's pronunciation and a native speaker's pronunciation, and digitizing the results of the evaluation.

SUMMARY OF THE INVENTION

Accordingly, the present invention has been made keeping in mind the above problems occurring in the prior art, and an object of the present invention is to provide a foreign language learning apparatus and method for correcting pronunciation through sentence input, in which a waveform is disposed in accordance with a sentence input by a user and a matching percentage is calculated by matching a voice input by a user with the previously stored waveform or a waveform generated via a TTS engine.

Another object of the present invention is to provide a foreign language learning apparatus and method for correcting pronunciation through sentence input, in which a curriculum for words each having a low matching percentage between a voice input by a user and a previously stored word waveform is generated and effective pronunciation correction is performed based on the curriculum.

Yet another object of the present invention is to provide a foreign language learning apparatus and method for correcting pronunciation through sentence input, in which an automatic review based on learning progress and a learning schedule can be performed based on Ebbinghaus' theory, individual customized learning is supported via enhanced learning, word supplementary learning, and pronunciation supplementary learning based on learning achievement, and a user can check a history of learnt grammar items based on the progress of sentence learning using a grammar tree.

In accordance with an aspect of the present invention, there is provided a foreign language learning apparatus using a function of reading an input sentence in voice via a TTS engine, the foreign language learning apparatus correcting pronunciation through sentence input, including a sentence input unit for receiving a first sentence from a user; a linked letter detection unit for detecting at least one letter corresponding to at least one linking rule by searching letters that form the first sentence received via the sentence input unit; a linked letter removal unit for removing the letter corresponding to the linking rule and detected by the linked letter detection unit and generating a second sentence by inserting a linking code into a part from which the letter has been removed; a partial waveform generation unit for generating one or more partial waveforms using the TTS engine with respect to a portion from a start point of the second sentence generated by the linked letter removal unit before the part into which the linking code has been inserted, a portion from the part into which the linking code has been inserted before a part into which a subsequent linking code has been inserted, and a portion from the part into which the subsequent linking code has been inserted to an end point of the second sentence; an input waveform generation unit for converting a voice corresponding to the first sentence received via the sentence input unit into an input waveform when the voice is received from a user; and a matching degree calculation unit for calculating a matching degree by comparing the input waveform generated by the input waveform generation unit with the one or more partial waveforms generated by the partial waveform generation unit and calculating a partial matching degree of a part having a highest matching degree in the partial waveforms by detecting the part having the highest matching degree while moving from a beginning of the input waveform to an end thereof in an order in which the one or more partial waveforms are disposed.

The linked letter detection unit may include a word detection unit for detecting an identical word by determining whether or not a word including the letter corresponding to the linking rule is identical with a word previously stored in a data storage unit when the letter corresponding to the linking rule is detected by the linked letter detection unit, and a word waveform insertion unit for inserting a word waveform corresponding to the previously stored word into a part corresponding to the word detected by the word detection unit; the word waveform may include one or more phonemic waveforms that corresponds to phonemes for respective letters that form the word; the linked letter removal unit may remove a phonemic waveform of the part corresponding to the letter that belongs to the letters of the word corresponding to the word waveform and that has been removed by the linked letter removal unit; the partial waveform generation unit may generate the one or more partial waveforms using the TTS engine with respect to a portion from the start point of the second sentence generated by the linked letter removal unit to a letter prior to the part into which the word waveform has been inserted, a portion from a letter posterior to the part into which the word waveform has been inserted to a letter prior to a part into which a subsequent word waveform has been inserted, and a portion from a letter posterior to the part into which the word waveform has been inserted to the end point of the second sentence; and the matching degree calculation unit may calculate a matching degree by comparing the input waveform generated by the input waveform generation unit with one or more word waveforms generated by the linked letter removal unit and then calculating a word matching degree of a part having a highest matching degree in each of the word waveforms by detecting the part having the highest matching degree while moving from the beginning of the input waveform to the end thereof in the order in which the one or more word waveforms are disposed.

The foreign language learning apparatus may further include a waveform speed calculation unit for detecting a partial waveform or a word waveform corresponding to a highest matching degree of the matching degrees calculated by the matching degree calculation unit and then calculating a comparative speed by comparing a playback length of an input waveform of a corresponding part with a playback length of the partial waveform or the word waveform corresponding to the highest matching degree; and a matching degree re-calculation unit for compressing or extending a total playback length of the input waveform based on the comparative speed calculated by the waveform speed calculation unit and then calculating the matching degree between each of the partial waveforms or the word waveforms and the input waveform of the corresponding part.

The linked letter detection unit may include a first linking rule in which a letter corresponding to a middle consonant of three consonants is detected if the three consonants are consecutive in one word or two words; a second linking rule in which "p," "t," or "k" is detected if "p," "t," or "k" is placed behind "s"; a third linking rule in which a rearmost consonant of a front word and a foremost vowel of a rear word are detected if the two words are consecutive, the front word ends with a consonant and the rear word starts with a vowel; and a fourth linking rule in which "d" or "t" is detected if "d" or "t" is placed between vowels.

The foreign language learning apparatus may further include a disposition sequence determination unit for sending a re-input signal to an output unit if the partial matching degree and the word matching degree of the input waveform calculated by the matching degree calculation unit are not identical with a disposition order of the second sentence.

The data storage unit may store a standard pronunciation video corresponding to each of the word waveforms.

The matching degree calculation unit may calculate a matching percentage for each word by comparing the input waveform with the word waveform on a word basis, calculate a matching percentage for each part by comparing the input waveform with the partial waveform on a partial waveform basis, calculate a matching percentage for each sentence by summing all the matching percentages for each word and all the matching percentages for each part and then dividing each of the sums by a total number of matching percentages for each word and matching percentages for each part, and send the calculated matching percentage for each word, the calculated matching percentage for each part, and the calculated matching percentage for each sentence to an output unit.

The foreign language learning apparatus may further include a learning achievement display unit for receiving a standard pronunciation video corresponding to a word waveform whose matching percentage for each word is lower than a predetermined reference matching degree from the data storage unit and outputting the received standard pronunciation video to the output unit.

After the one or more word waveforms have been output to the output unit, a voice corresponding to each of the one or more word waveforms may be received from a user via an input unit, a matching percentage for each word corresponding to each of the word waveforms may be generated, and the learning achievement display unit may calculate an average value for each word on a word waveform basis and output the calculated average value for each word to the output unit on a word waveform basis.

The learning achievement display unit may perform individual customized learning based on the average value for each word waveform.

The learning achievement display unit may output a standard pronunciation video corresponding to some or all of word waveforms whose average values are lower than a reference matching degree, may search for sentence data including the word waveforms in order to improve a matching percentage for each word of each of the output word waveforms, and may send the retrieved sentence data to the output unit; and the data storage unit may store one or more pieces of sentence data.

The foreign language learning apparatus may further include a review unit for outputting previously output word waveforms again when a review request signal is received from the sentence input unit, that is, periodically outputting the word waveforms in a review cycle that corresponds to an Ebbinghaus forgetting curve.

In accordance with another aspect of the present invention, there is provided a foreign language learning method using a function of reading an input sentence in voice through a TTS engine, the foreign language learning method correcting pronunciation through sentence input, including step (a) of receiving a first sentence from a user via a sentence input unit; step (b) of detecting, by a linked letter detection unit, at least one letter corresponding to at least one linking rule by searching letters that form the first sentence received via the sentence input unit; step (c) of removing, by a linked letter removal unit, the letter corresponding to the linking rule detected by the linked letter detection unit, and generating, by the linked letter removal unit, a second sentence by inserting a linking code into a part from which the letter has been removed; step (d) of generating, by a partial waveform generation unit, one or more partial waveforms using the TTS engine with respect to a portion from a start point of the second sentence generated by the linked letter removal unit before a part into which the linking code has been inserted, a portion from the part into which the linking code has been inserted before a part into which a subsequent linking code has been inserted, and a portion from the part into which the subsequent linking code has been inserted to an end point of the second sentence; step (e) of converting, by an input waveform generation unit, a voice corresponding to the first sentence received through the sentence input unit into an input waveform when the voice is received from a user; and step (f) of calculating, by a matching degree calculation unit, a matching degree by comparing the input waveform generated by the input waveform generation unit with the one or more partial waveforms generated by the partial waveform generation unit, and calculating, by the matching degree calculation unit, a partial matching degree of a part having a highest matching degree in each of the partial waveforms by detecting the part having the highest matching degree while moving from a beginning of the input waveform to an end thereof in an order in which the one or more partial waveforms are disposed.

Step (b) may include step (b1) of detecting, by a word detection unit, an identical word by determining whether or not a word including the letter corresponding to the linking rule is identical with a word previously stored in a data storage unit when the letter corresponding to the linking rule is detected by the linked letter detection unit, and step (b2) of inserting, by a word waveform insertion unit, a word waveform corresponding to the previously stored word into a part corresponding to the word detected by the word detection unit; the word waveform may include one or more phonemic waveforms that corresponds to phonemes for respective letters that form the word; the linked letter removal unit may remove a phonemic waveform of the part corresponding to the letter that belongs to the letters of the word corresponding to the word waveform and that has been removed by the linked letter removal unit; the partial waveform generation unit may generate the one or more partial waveforms using the TTS engine with respect to a portion from the start point of the second sentence generated by the linked letter removal unit to a letter prior to the part into which the word waveform has been inserted, a portion from a letter posterior to the part into which the word waveform has been inserted to a letter prior to a part into which a subsequent word waveform has been inserted, and a portion from a letter posterior to the part into which the word waveform has been inserted to the end point of the second sentence; and the matching degree calculation unit may calculate a matching degree by comparing the input waveform generated by the input waveform generation unit with one or more word waveforms generated by the linked letter removal unit and then calculating a word matching degree of a part having a highest matching degree in each of the word waveforms by detecting the part having the highest matching degree while moving from the beginning of the input waveform to the end thereof in the order in which the one or more word waveforms are disposed.

The foreign language learning method may further include step (h) of detecting, by a waveform speed calculation unit, a partial waveform or a word waveform corresponding to a highest matching degree of the matching degrees calculated by the matching degree calculation unit, and then calculating, by the waveform speed calculation unit, a comparative speed by comparing a playback length of an input waveform of a corresponding part with a playback length of the partial waveform or the word waveform corresponding to the highest matching degree, and step (i) of compressing or extending, by a matching degree re-calculation unit, a total playback length of the input waveform based on the comparative speed calculated by the waveform speed calculation unit, and then calculating, by the matching degree re-calculation unit, the matching degree between each of the partial waveforms or the word waveforms and the input waveform of the corresponding part.

The linked letter detection unit may include a first linking rule in which a letter corresponding to a middle consonant of three consonants is detected if the three consonants are consecutive in one word or two words; a second linking rule in which "p," "t," or "k" is detected if "p," "t," or "k" is placed behind "s"; a third linking rule in which a rearmost consonant of a front word and a foremost vowel of a rear word are detected if the two words are consecutive, the front word ends with a consonant and the rear word starts with a vowel; and a fourth linking rule in which "d" or "t" is detected if "d" or "t" is placed between vowels.

The foreign language learning method may further include step (g) of sending, by a disposition sequence determination unit, a re-input signal to an output unit if the partial matching degree and the word matching degree of the input waveform calculated by the matching degree calculation unit is not identical with a disposition order of the second sentence.

The data storage unit may store a standard pronunciation video corresponding to each of the word waveforms.

The matching degree calculation unit may calculate a matching percentage for each word by comparing the input waveform with the word waveform on a word basis, may calculate a matching percentage for each part by comparing the input waveform with the partial waveform on a partial waveform basis, may calculate a matching percentage for each sentence by summing all the matching percentages for each word and all the matching percentages for each part and then dividing each of the sums by a total number of matching percentages for each word and matching percentages for each part, and may send the calculated matching percentage for each word, the calculated matching percentage for each part, and the calculated matching percentage for each sentence to an output unit.

The foreign language learning method may further include step (j) of receiving, by a learning achievement display unit, a standard pronunciation video corresponding to a word waveform whose matching percentage for each word is lower than a predetermined reference matching degree from the data storage unit, and outputting, by the learning achievement display unit, the received standard pronunciation video to the output unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of a foreign language learning apparatus and method for correcting pronunciation through sentence input according to the present invention will be described below with reference to the accompanying drawings.

The present invention relates to a foreign language learning apparatus and method using a function of reading an input sentence in voice via a TTS engine.

Figure 1:
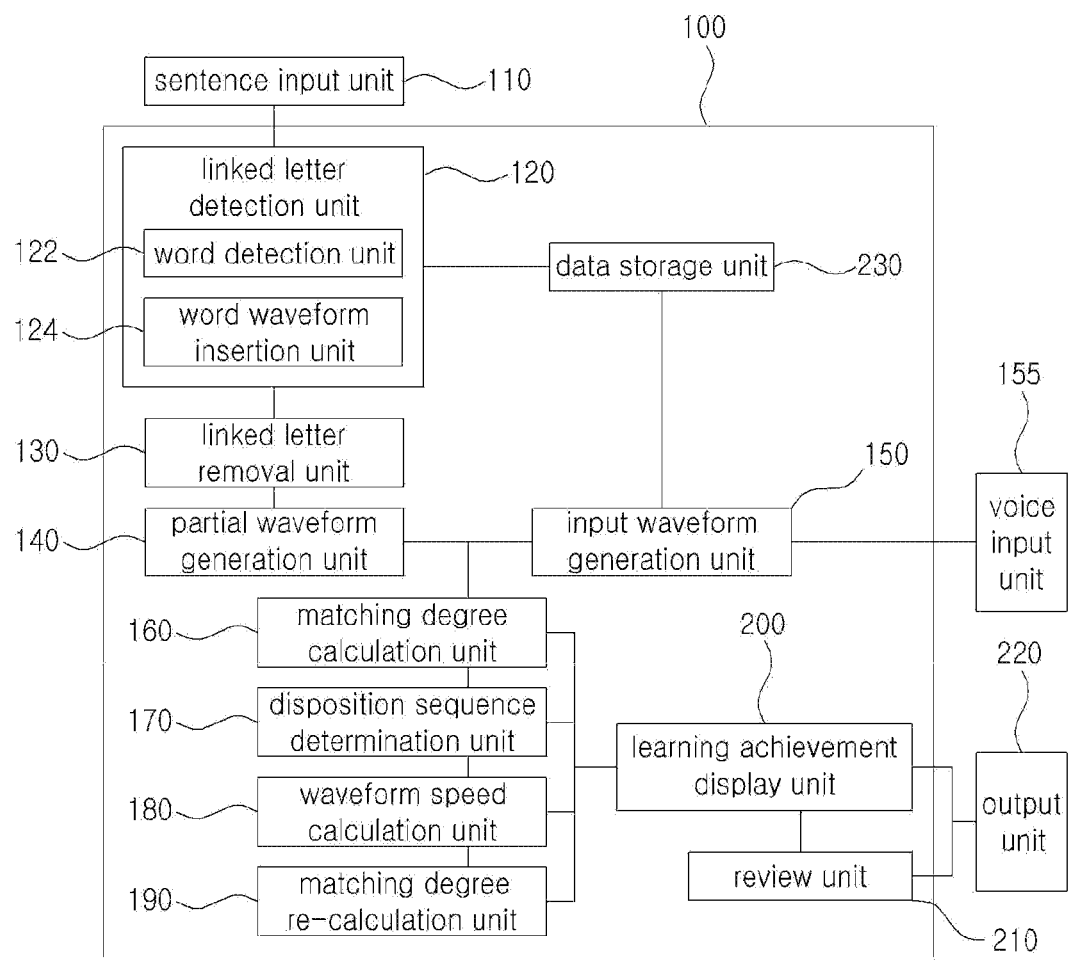
FIG. 1 is a block diagram of a foreign language learning apparatus for correcting pronunciation through sentence input according to an embodiment of the present invention.
Figure 2:
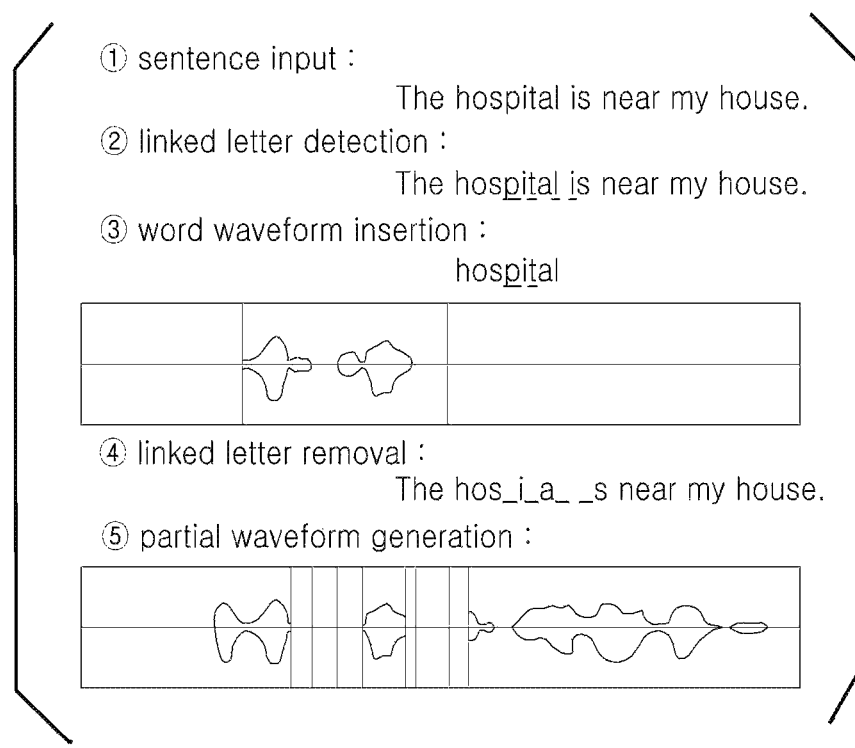
FIGS. 2 and 3 are diagrams showing examples in which the foreign language learning apparatus and method for correcting pronunciation through sentence input according to an embodiment of the present invention are operated.
Figure 3:
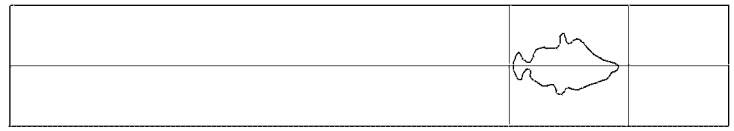
Figure 3:
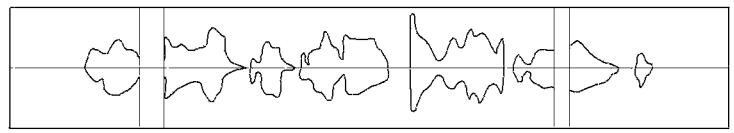

FIG. 1 is a block diagram of a foreign language learning apparatus 100 for correcting pronunciation through sentence input according to an embodiment of the present invention, and FIGS. 2 and 3 are diagrams showing examples in which the foreign language learning apparatus 100 for correcting pronunciation through sentence input according to an embodiment of the present invention is operated.

Referring to FIGS. 1 to 3, the foreign language learning apparatus 100 for correcting pronunciation through sentence input according to the present invention includes a sentence input unit 110, a linked letter detection unit 120, a linked letter removal unit 130, a partial waveform generation unit 140, an input waveform generation unit 150, a matching degree calculation unit 160, a disposition sequence determination unit 170, a voice recognition processing unit, a waveform speed calculation unit 180, a matching degree re-calculation unit 190, a data storage unit 240, a learning achievement display unit 200, and a review unit 210.

The sentence input unit 110 receives a first sentence from a user.

The linked letter detection unit 120 detects one or more letters corresponding to one or more linking rules by searching letters that form the first sentence received via the sentence input unit 110.

Furthermore, the linked letter detection unit 120 includes a first linking rule, a second linking rule, a third linking rule, and a fourth linking rule.

In accordance with the first linking rule, when three consonants are consecutive in one word or two words, a letter corresponding to the middle consonant of the three consonants is detected.

This corresponds to a phenomenon in which when three consonants are consecutive in one word or two words, a sound corresponding to the middle consonant of the three consonants is omitted. Examples thereof may be the words "friendly" ("d" is detected), "apartment" (in this case, "t" is detected), and "directly" (in this case, "t" is detected).

In accordance with the second linking rule, when "p," "t," or "k" is placed behind "s," the letter "p," "t," or "k" is detected.

When "p," "t," or "k" is placed behind "s," a letter from which a fortis is generated is detected because a fortis is generated by the "p," "t," or "k". Examples thereof may be "special" (in this case, "p" is detected) and "street" (in this case, "t" is detected).

In accordance with the third linking rule, when two words are consecutive, the front word ends with a consonant and the rear word starts with a vowel, the rearmost consonant of the front word and the foremost vowel of the rear word are detected.

When two words are consecutive, the front word ends with a consonant, and the rear word starts with a vowel, the rearmost consonant of the front word and the foremost vowel of the rear word are detected because the two words generate linking in such a manner that the front consonant is added to the rear vowel. Examples thereof may be "come out" (in this case, "m" and "o" are detected) and "work out" (in this case, "k" and "o" are detected).

In accordance with the fourth linking rule, when "d" or "t" is placed between vowels, "d" or "t" is detected.

The reason for this is that "d" or "t" generates the "r" sound when "d" or "t" is placed between vowels. Examples thereof may be "better" (in this case, "tt" is detected) and "water" (in this case, "t" is detected).

Furthermore, the linked letter detection unit 120 includes a word detection unit 122, and a word waveform insertion unit 124.

When the linked letter detection unit 120 detects a letter corresponding to one of the linking rules, the word detection unit 122 detects an identical word by determining whether or not a word including the letter is identical with a word previously stored in the data storage unit 240.

That is, when waveforms are generated using the TTS engine, words corresponding to the linking rules do not produce a fortis or do not generate linking. Such words are stored in the data storage unit 240, and words other than the words stored in the data storage unit 240 are driven using the TTS engine. When a letter corresponding to one of the linking rules is detected, a linking code is inserted into a part corresponding to the detected letter.

When the sentence "The hospital is near my house" is taken as an example, the linking rules are applied to "p," which is the fourth letter of the word "hospital," "t," which the sixth letter of the word "hospital," "l," which is the eighth letter of the word "hospital," and "l," which is the first letter of the word "is". If the word "hospital" is previously stored in the data storage unit 240, the part "hospital" is detected.

The word waveform insertion unit 124 inserts a word waveform corresponding to a word detected by the word detection unit 122.

That is, a word waveform from which the phonemic waveforms of the parts "p" and "t" in the word "hospital" have been removed is fetched from the data storage unit 240, and is then inserted.

Furthermore, linking is generated between "l," which is the eighth letter of the word "hospital," and "i," which is the first letter of the word "is," because the word "is" is added to the rear of the word "hospital." Phonemic waveforms corresponding to the parts "l" and "i" are removed.

In this case, the word waveform is divided into phonemes for letters that form a word, and a phonemic waveform is associated with each of the phonemes.

That is, phonemic waveforms are assigned to the respective letters "h," "o," "s," "p," "i," "t," "a," and "l" that form the word "hospital," and thus the phonemic waveforms may be removed on a phonemic basis.

Accordingly, when the phonemic waveforms are removed from the word waveform of the word "hospital," "hos_i_a_" results.

The linked letter removal unit 130 removes one or more letters corresponding to one or more of the linking rules detected by the linked letter detection unit 120, and removes phonemic waveforms corresponding to parts from which the letters have been removed, thereby generating a second sentence.

Furthermore, the linked letter removal unit 130 removes the phonemic waveforms of parts corresponding to the letters that belong to letters that form the word corresponding to the word waveform and have been removed by the linked letter removal unit 130.

That is, when the sentence "This is a picture of a street" is taken as an example, linking is generated between "s," which is the fourth letter of the word "this," and "i," which is the first letter of the word "is," and between "f," which is the second letter of the word "of," the word "a," and "t," which is the second letter of the word "street".

Assuming that each of the words has not been detected by the word detection unit 122, the second sentence "thi_ _s picture o_ _ s_reet" may be generated by removing the letters in which the linking has been generated.

The partial waveform generation unit 140 generates partial waveforms using the TTS engine with respect to the portion from the start point of the second sentence generated by the linked letter removal unit 130 before a part into which a linking code has been inserted, the portion from the part into which the linking code has been inserted before a part into which a subsequent linking code has been inserted, and the portion from the part into which the subsequent linking code has been inserted to the end point of the second sentence.

Furthermore, the partial waveform generation unit 140 generates partial waveforms using the TTS engine with respect to the portion from the start point of the second sentence generated by the linked letter removal unit 130 to a letter prior to a part into which a word waveform has been inserted, the portion from a letter posterior to the part into which the word waveform has been inserted to a letter prior to a part into which a subsequent word waveform has been inserted, and the portion from a letter posterior to the part into which the subsequent word waveform has been inserted to the end point of the second sentence.

In this case, it is preferred that the word waveform is inserted after the partial waveforms have been generated.

When the second sentence "thi_ _s picture o_ _ s_reet" generated by the linked letter removal unit 130 is taken as an example, a partial waveform is generated with respect to the portion from "t," which the start point of the second sentence, to "i," which is a part into which a linking code has been first inserted, that is, with respect to the portion corresponding to "thi," a partial waveform is generated with respect to the portion from "s" posterior to the part into which the linking code has been inserted to "o," which is a part into which a subsequent linking code has been inserted, that is, with respect to the portion corresponding to "s picture o," a partial waveform is generated with respect to "s," and a partial waveform is generated with respect to the portion from "r," which is a part into which another linking code has been inserted, to "t," which is the end point of the second sentence, that is, with respect to the portion corresponding to "reet".

If the word "street" is identical with a word previously stored in the data storage unit 240, the second sentence "thi_ _s picture o_ _ _____" is generated. In this case, partial waveforms are generated with respect to "thi" and "s picture o," and a word waveform corresponding to the word "street" is inserted into the part "_____." However, since "t" corresponds to a linked letter, a word waveform corresponding to "s_reet" is inserted into the part "_____". As a result, the second sentence includes two partial waveforms and the one word waveform.

When a user inputs a voice corresponding to the first sentence received via the sentence input unit 110, the input waveform generation unit 150 converts the input voice into an input waveform.

A user may input a voice via a voice input device, such as a microphone.

The matching degree calculation unit 160 calculates a matching degree by comparing an input waveform generated by the input waveform generation unit 150 with one or more partial waveforms generated by the partial waveform generation unit 140. In this case, the matching degree calculation unit 160 detects each part having the highest matching degree while moving from the beginning of the input waveform to the end thereof in the order in which the one or more partial waveforms are disposed, and then calculates the matching degree of a part having the highest matching degree in each partial waveform.

Furthermore, the matching degree calculation unit 160 calculates a matching degree by comparing an input waveform generated by the input waveform generation unit 150 with one or more partial waveforms generated by the partial waveform generation unit 140. In this case, the matching degree calculation unit 160 detects a part having the highest matching degree from the beginning of the input waveform to the end thereof in the order in which the one or more word waveforms are disposed, and then calculates the word matching degree of a part having the highest matching degree in each word waveform.

For example, the partial matching degree of "thi_ _s picture o_ _ s_reet," which is an example of a second sentence, is calculated below. The partial matching degree between the partial waveform of "thi" and an input waveform is calculated by comparing the partial waveform of "thi" with the entire input waveform from the beginning of the input waveform to the end thereof. The partial matching degree between the partial waveform of "s picture o" and the input waveform is calculated by comparing the partial waveform of "s picture o" with the entire input waveform from the beginning of the input waveform to the end thereof. The partial matching degree between the partial waveform of "s" and the input waveform is calculated by comparing the partial waveform of "s" with the entire input waveform from the beginning of the input waveform to the end thereof. The partial matching degree between the partial waveform of "treet" and the input waveform is calculated by comparing the partial waveform of "treet" with the entire input waveform from the beginning of the input waveform to the end thereof.

If the word "street" is identical with a word previously stored in the data storage unit 240, "thi_ _s picture o_ _ _____" is a second sentence. In this case, the partial matching degree between the partial waveform of "thi" and the input waveform is calculated by comparing the partial waveform of "thi" with the entire input waveform from the beginning of the input waveform to the end thereof, the partial matching degree between the partial waveform of "s picture o" and the input waveform is calculated by comparing the partial waveform "s picture o" with the entire input waveform from the beginning of the input waveform to the end thereof, and the word matching degree between "s_reet," that is, a word corresponding to "_____," and the input waveform is calculated by comparing the word waveform of "s_reet" with the entire input waveform from the beginning of the input waveform to the end thereof.

Furthermore, if the order of the partial matching degrees and word matching degrees of the input waveform calculated by the matching degree calculation unit 160 is not identical with that of the disposition of the second sentence, it is preferred that the disposition sequence determination unit 170 send a re-input signal to the output unit 230.

That is, if the order of parts with respect to which partial matching degrees have been calculated is not identical with that of the disposition of partial waveforms, it is preferred that the disposition sequence determination unit 170 send a re-input signal prompting a user to input a voice corresponding to a first sentence again to the output unit 230.

Furthermore, the matching degree calculation unit 160 calculates a matching percentage for each word by comparing the input waveform with the word waveform on a word basis, calculates a matching percentage for each part by comparing the input waveform with the partial waveform on a partial waveform basis, calculates a matching percentage for each sentence by summing all the matching percentages for each word and all the matching percentages for each part and then dividing the sum by the total number of the matching percentages for each word and the matching percentages for each part, and then sends the calculated matching percentage for each word, the calculated matching percentage for each part, and the calculated matching percentage for each sentence to the output unit 230.

That is, if the word waveform of the word "street" in the sentence "This is a picture of a street" has been previously generated, "thi_ _s picture o_ _ s_reet" is obtained by removing linked letters from the sentence.

In this case, assuming that the value of the partial waveform of "thi" is 70, the value of the partial waveform of "s picture o" is 60 and the value of the word waveform of "s_reet" is 50 when the matching percentages between an input waveform and each partial waveform and each word waveform are calculated, the values of the partial waveforms are 70 and 60 and the value of the word waveform is 50.

As a result, a matching percentage for each sentence is (70+60+50)/3, that is, 60.

The waveform speed calculation unit 180 detects a partial waveform or a word waveform corresponding to the highest matching degree from among the matching degrees calculated by the matching degree calculation unit 160, and calculates a comparative speed by comparing the playback length of the input waveform of a corresponding part with the playback length of the partial waveform or word waveform corresponding to the highest matching degree.

The matching degree re-calculation unit 190 compresses or extends the total playback length of the input waveform based on the comparative speed calculated by the waveform speed calculation unit 180, and calculates the matching degree between each of all the partial waveforms or the word waveforms, and the input waveform of a corresponding part again.

That is, since a matching degree may change depending on the playback speed of the input waveform, it is preferred that a matching degree be calculated after compressing or extending the playback length of an input waveform in order to prevent the change in matching degree.

Furthermore, whether the speed of pronunciation for a specific word of a specific section is erroneous can be checked because the speed of an input waveform is compared with the speed of each of each partial waveform and the speed of each word waveform.

The data storage unit 240 stores already stored words, one or more word waveforms corresponding to each of the words, and a standard pronunciation video for each of the word waveforms.

That is, the standard pronunciation video for each of the word waveforms that is stored in the data storage unit 240 may be stored for each word waveform corresponding to each word that is stored in the data storage unit 240.

Furthermore, the matching degree calculation unit 160 calculates a matching percentage for each word waveform by comparing the input waveform with the word waveforms on a word waveform basis, calculates a matching percentage for each part by comparing the input waveform with the partial waveform on a partial waveform basis, calculates a matching percentage for each sentence by summing all the matching percentages for each word and all the matching percentages for each part and then dividing the sum by the total number of matching percentages for each word and matching percentages for each part, and sends the calculated matching percentage for each word waveform, the calculated matching percentage for each part, and the calculated matching percentage for each sentence to the output unit 230.

The foreign language learning apparatus for correcting pronunciation through sentence input further includes the learning achievement display unit 200 configured to receive a standard pronunciation video corresponding to the word waveform whose matching percentage for each word or each sentence is lower than a predetermined reference matching degree from the data storage unit 240, and outputs the received standard pronunciation video to the output unit 230.

Accordingly, if a pronunciation corresponds to a pronunciation whose matching degree is lower than a reference matching degree, a user may intensively learn an accurate pronunciation method through pronunciation learning.

For example, in the case of the phoneme "r," a user may practice words, such as "perfect," "door," and "river," which include the phoneme "r," and sentences, such as "The door is opened" and "He is going to the Hangang River, which includes the phoneme "r."

In this case, the average value of the phoneme "r" input by the user is calculated and compared with a reference matching degree. If, as a result of the comparison, the average value satisfies the reference matching degree, a criterion for the reference matching degree is rounded up, and thus the user can further practice the phoneme "r" which the user is poor at pronouncing.

When voice recognition learning is performed, a reference matching degree can be rounded up stepwise, and a plurality of sentences and words corresponding to a corresponding pronunciation can be practiced, thereby improving the accuracy of user pronunciation.

Furthermore, the learning achievement display unit 200 allows individual customized learning to be performed based on the average value for each word.

In the individual customized learning, it is preferred that a user repetitively practice a word whose matching degree is lower than the reference matching degree.

Furthermore, the learning achievement display unit 200 outputs a standard pronunciation video for each word waveform corresponding to some or all of word waveforms whose average value for each word is lower than the reference matching degree, searches for sentence data including the word waveforms in order to improve a matching percentage for each word of each of the output word waveforms, and sends the retrieved sentence data to the output unit 230. The data storage unit 240 stores one or more pieces of sentence data.

For example, if matching percentage values for a word "street" are 80, 60, and 40 via three tests, the average value of the matching percentages of the pronunciation of the word is 60.

Individual customized learning is performed based on the average value of calculated matching percentages as described above.

If the average value falls within the range from 100 to 80, enhanced learning or a challenge mode may be performed. If the average value falls within the range from 79 to 60, full review or error review may be initiated. If the average value is equal to or lower than 59, full review or pronunciation learning may be performed.

In the enhanced learning, the speaking level of a user can be improved by playing back a native speaker's voice at high speed. In the challenge mode, a user's learning level can be raised by consistently updating an average value achieved by the user. In the full review, the entire content that has been already learnt is leant again. In the error review, a user can correct erroneous pronunciations again. In the pronunciation learning, a standard pronunciation video for each sentence waveform is output, and a user can intensively learn pronunciations at which the user is poor.

For example, if a reference matching degree is 80, a standard pronunciation video corresponding to "want" whose matching degree is lower than the reference matching degree may be received from the data storage unit 240, the standard pronunciation video may be output to the output unit 230, and thus a user can repetitively practice with the standard pronunciation video.

When a review request signal is generated by the input unit, the review unit 210 outputs an already output word waveform again, that is, the review unit 210 periodically outputs the word waveform in accordance with a review cycle that corresponds to the Ebbinghaus forgetting curve.

Ebbinghaus's theory refers to the theory in which it is important to perform appropriate repetition with appropriate timing in accordance with the cycle of the forgetting curve in order to permanently preserve decreasing memory as long-term memory based on the fact that a human's memory is in inverse proportion to the square of the passage of time. A review request signal is transmitted after 10 minutes, 1 day, 1 week, and 1 month, that is, in review cycles.

Figure 4:
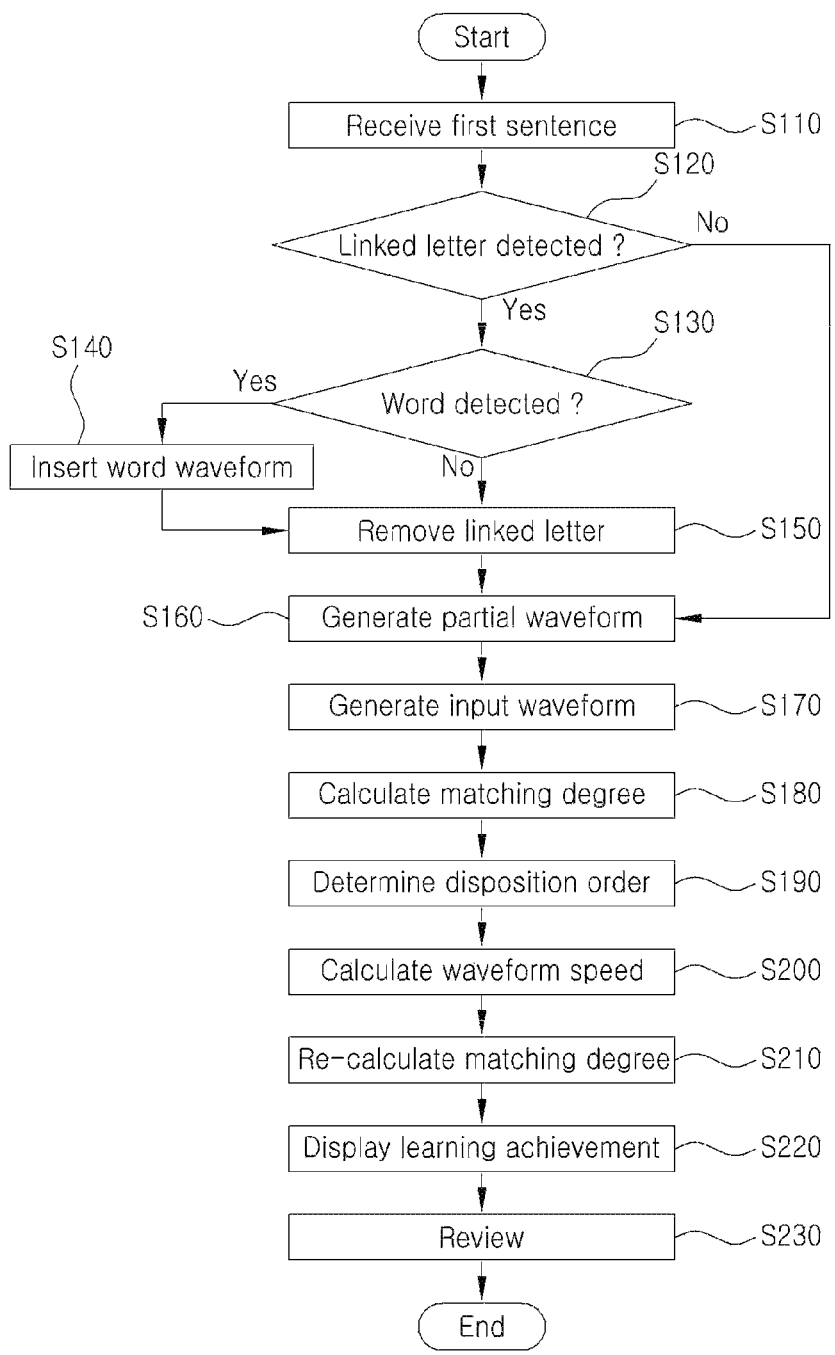
FIG. 4 is a flowchart showing a foreign language learning method for correcting pronunciation through sentence input according to an embodiment of the present invention.

FIG. 4 is a flowchart illustrating a foreign language learning method for correcting pronunciation through sentence input according to an embodiment of the present invention.

Referring to FIG. 4, first, a user inputs a first sentence through the sentence input unit 110 at step S110.

The linked letter detection unit 120 detects at least one letter corresponding to at least one of the linking rules by searching letters that form the first sentence received via the sentence input unit 110 at step S120.

If a letter corresponding to one of the linking rules is not present, the process returns to step S170 at which partial waveforms are generated.

If the linked letter detection unit 120 detects at least one letter corresponding to at least one of the linking rules, the word detection unit 122 detects a word including the detected letter by determining whether or not the word including the detected letter is identical with a word previously stored in the data storage unit 240 at step S130.

If, as a result of the determination, it is determined that the word including the detected letter is not identical with any word previously stored in the data storage unit 240, the process directly returns to step S160 at which a linked letter is removed.

If, as a result of the determination, it is determined that the word including the detected letter is identical with a word previously stored in the data storage unit 240, the word waveform insertion unit 124 inserts a word waveform corresponding to the previously stored word into the word detected by the word detection unit 122 at step S140.

Thereafter, the linked letter removal unit 130 removes the letter corresponding to the linking rule detected by the linked letter detection unit 120 and generates a second sentence by inserting a linking code into a part from which the letter has been removed at step S150.

In this case, if the phonemic code of a part corresponding to the letter that belongs to letters that form the word corresponding to the word waveform and has been removed by the linked letter removal unit 130 is detected, the linked letter removal unit 130 removes a phoneme corresponding to the phonemic code, and inserts a linking code into a part from which the phoneme has been removed.

The partial waveform generation unit 140 generates partial waveforms using the TTS engine with respect to the portion from the start point of the second sentence generated by the linked letter removal unit 130 before a part into which a linking code has been inserted, the portion from the part into which the linking code has been inserted before a part into which a subsequent linking code has been inserted, the portion from the part into which the subsequent linking code has been inserted to the end point of the second sentence, the portion from the start point of the second sentence before a letter prior to a part into which a word waveform has been inserted, the portion from a letter posterior to the part into which the word waveform has been inserted to a letter prior to a part into which a subsequent word waveform has been inserted, and the portion from a letter posterior to the part into which the subsequent word waveform has been inserted to the end point of the second sentence at step S160.

When a user inputs a voice corresponding to the first sentence received via the sentence input unit 110, the input waveform generation unit 150 converts the received voice into an input waveform at step S170.

Thereafter, the matching degree calculation unit 160 calculates a matching degree by comparing the input waveform generated by the input waveform generation unit 150 with one or more partial waveforms generated by the partial waveform generation unit 140 and a word waveform at step S180. In this case, the matching degree calculation unit 160 calculates the partial matching degree of a part having the highest matching degree in each of the one or more partial waveforms and the word waveform by matching the input waveform with the one or more partial waveforms and the word waveform in the order in which the one or more partial waveforms and the word waveform are disposed.

The disposition sequence determination unit 170 sends a re-input signal to the output unit 230 if the partial matching degree of the input waveform and the word waveform calculated by the matching degree calculation unit 160 is not identical with the order in which the second sentence is disposed at step S190.

Thereafter, the waveform speed calculation unit 180 detects a partial waveform or a word waveform corresponding to the highest matching degree from among the matching degrees calculated by the matching degree calculation unit 160 and calculates a comparative speed by comparing the playback length of the input waveform with the playback length of the partial waveform or the word waveform having the highest matching degree at step S200.

Thereafter, the matching degree re-calculation unit 190 compresses or extends the entire playback length of the input waveform based on the comparative speed calculated by the waveform speed calculation unit 180 and then calculates the matching degree between each of all the partial waveforms or all the word waveforms and the input waveform of a corresponding part again at step S210.

Thereafter, the learning achievement display unit 200 receives a standard pronunciation video corresponding to a word waveform whose matching percentage for each word waveform is lower than a predetermined reference matching degree from the data storage unit 240 and then outputs the standard pronunciation video to the output unit 230 at step S220.

In this case, the foreign language learning apparatus that further includes the data storage unit 240 configured to store a standard pronunciation video corresponding to each word waveform and that corrects a pronunciation through sentence input receives an input waveform from the voice input unit 155 when a user learns a sentence, and stores respective voice waveforms for one or more words, into which the input waveform has been divided by the voice recognition processing unit using the TTS engine, in the data storage unit 240.

Furthermore, the learning achievement display unit 200 outputs the one or more word waveforms to the output unit 230. A user voice corresponding to each of the one or more word waveforms is received from the voice input unit 155. A matching percentage for each word corresponding to each word waveform is generated, an average value for each word is calculated on a word waveform basis, and the calculated average value is output to the output unit 230 on a word waveform basis.

Furthermore, the learning achievement display unit 200 performs individual customized learning based on the average value for each word waveform.

Furthermore, the learning achievement display unit 200 outputs a standard pronunciation video for each word waveform, corresponding to some or all of word waveforms whose average value for each word waveform is lower than a reference matching degree, searches for sentence data including the word waveforms in order to improve a matching percentage for each word corresponding to the output word waveform, and sends the retrieved sentence data to the output unit 230. The data storage unit 240 stores one or more pieces of sentence data.

When a review request signal is generated by the input unit, the review unit 210 outputs the previously output word waveforms again, that is, the review unit 210 periodically output the word waveforms in a review cycle that corresponds to the Ebbinghaus forgetting curve at step S230.

As described above, the present invention provides the foreign language learning apparatus and method for correcting pronunciation through sentence input, in which a waveform is disposed in accordance with a sentence input by a user and a matching percentage is calculated by matching a voice input by a user with the previously stored waveform or a waveform generated via a TTS engine.

Furthermore, the present invention provides the foreign language learning apparatus and method for correcting pronunciation through sentence input, in which a curriculum for words each having a low matching percentage between a voice input by a user and a previously stored word waveform is generated and effective pronunciation correction is performed based on the curriculum.

Moreover, the present invention provides the foreign language learning apparatus and method for correcting pronunciation through sentence input, in which an automatic review based on learning progress and a learning schedule can be performed based on Ebbinghaus' theory, individual customized learning is supported via enhanced learning, word supplementary learning, and pronunciation supplementary learning based on learning achievement, and a user can check a history of learnt grammar items based on the progress of sentence learning using a grammar tree.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A foreign language learning apparatus using a function of reading an input sentence in voice via a Text To Speech (TTS) engine, the foreign language learning apparatus correcting pronunciation through sentence input, comprising: a sentence input unit for receiving a first sentence from a user; a linked letter detection unit for detecting at least one letter corresponding to at least one linking rule by searching letters that form the first sentence received via the sentence input unit; a linked letter removal unit for removing the letter corresponding to the linking rule and detected by the linked letter detection unit and generating a second sentence by inserting a linking code into a part from which the letter has been removed; a partial waveform generation unit for generating one or more partial waveforms using the TTS engine with respect to a portion from a start point of the second sentence generated by the linked letter removal unit before the part into which the linking code has been inserted, a portion from the part into which the linking code has been inserted before a part into which a subsequent linking code has been inserted, and a portion from the part into which the subsequent linking code has been inserted to an end point of the second sentence; an input waveform generation unit for converting a voice corresponding to the first sentence received via the sentence input unit into an input waveform when the voice is received from a user; and a matching degree calculation unit for calculating a matching degree by comparing the input waveform generated by the input waveform generation unit with the one or more partial waveforms generated by the partial waveform generation unit and calculating a partial matching degree of a part having a highest matching degree in the partial waveforms by detecting the part having the highest matching degree while moving from a beginning of the input waveform to an end thereof in an order in which the one or more partial waveforms are disposed,
wherein: the linked letter detection unit comprises: a word detection unit for detecting an identical word by determining whether or not a word including the letter corresponding to the linking rule is identical with a word previously stored in a data storage unit when the letter corresponding to the linking rule is detected by the linked letter detection unit; and a word waveform insertion unit for inserting a word waveform corresponding to the previously stored word into a part corresponding to the word detected by the word detection unit; wherein the word waveform comprises one or more phonemic waveforms that corresponds to phonemes for respective letters that form the word; wherein the linked letter removal unit removes a phonemic waveform of the part corresponding to the letter that belongs to the letters of the word corresponding to the word waveform and that has been removed by the linked letter removal unit; wherein the partial waveform generation unit generates the one or more partial waveforms using the TTS engine with respect to a portion from the start point of the second sentence generated by the linked letter removal unit to a letter prior to the part into which the word waveform has been inserted, a portion from a letter posterior to the part into which the word waveform has been inserted to a letter prior to a part into which a subsequent word waveform has been inserted, and a portion from a letter posterior to the part into which the word waveform has been inserted to the end point of the second sentence; and wherein the matching degree calculation unit calculates a matching degree by comparing the input waveform generated by the input waveform generation unit with one or more word waveforms generated by the linked letter removal unit and then calculating a word matching degree of a part having a highest matching degree in each of the word waveforms by detecting the part having the highest matching degree while moving from the beginning of the input waveform to the end thereof in the order in which the one or more word waveforms are disposed.

2. The foreign language learning apparatus of claim 1, further comprising: a waveform speed calculation unit for detecting a partial waveform or a word waveform corresponding to a highest matching degree of the matching degrees calculated by the matching degree calculation unit and then calculating a comparative speed by comparing a playback length of an input waveform of a corresponding part with a playback length of the partial waveform or the word waveform corresponding to the highest matching degree; and a matching degree re-calculation unit for compressing or extending a total playback length of the input waveform based on the comparative speed calculated by the waveform speed calculation unit and then calculating the matching degree between each of the partial waveforms or the word waveforms and the input waveform of the corresponding part.

3. The foreign language learning apparatus of claim 1, wherein the linked letter detection unit comprises: a first linking rule in which a letter corresponding to a middle consonant of three consonants is detected if the three consonants are consecutive in one word or two words; a second linking rule in which "p," "t," or "k" is detected if "p," "t," or "k" is placed behind "s"; a third linking rule in which a rearmost consonant of a front word and a foremost vowel of a rear word are detected if the two words are consecutive, the front word ends with a consonant and the rear word starts with a vowel; and a fourth linking rule in which "d" or "t" is detected if "d" or "t" is placed between vowels.

4. The foreign language learning apparatus of claim 1, further comprising a disposition sequence determination unit for sending a re-input signal to an output unit if the partial matching degree and the word matching degree of the input waveform calculated by the matching degree calculation unit are not identical with a disposition order of the second sentence.

5. The foreign language learning apparatus of claim 1, wherein the data storage unit stores a standard pronunciation video corresponding to each of the word waveforms.

6. The foreign language learning apparatus of claim 1, wherein the matching degree calculation unit calculates a matching percentage for each word by comparing the input waveform with the word waveform on a word basis, calculates a matching percentage for each part by comparing the input waveform with the partial waveform on a partial waveform basis, calculates a matching percentage for each sentence by summing all the matching percentages for each word and all the matching percentages for each part and then dividing each of the sums by a total number of matching percentages for each word and matching percentages for each part, and sends the calculated matching percentage for each word, the calculated matching percentage for each part, and the calculated matching percentage for each sentence to an output unit.

7. The foreign language learning apparatus of claim 6, further comprising a learning achievement display unit for receiving a standard pronunciation video corresponding to a word waveform whose matching percentage for each word is lower than a predetermined reference matching degree from the data storage unit and outputting the received standard pronunciation video to the output unit.

8. The foreign language learning apparatus of claim 7, wherein after the one or more word waveforms have been output to the output unit, a voice corresponding to each of the one or more word waveforms is received from a user via an input unit, a matching percentage for each word corresponding to each of the word waveforms is generated, and the learning achievement display unit calculates an average value for each word on a word waveform basis and outputs the calculated average value for each word to the output unit on a word waveform basis.

9. The foreign language learning apparatus of claim 8, wherein the learning achievement display unit performs individual customized learning based on the average value for each word waveform.

10. The foreign language learning apparatus of claim 9, wherein: the learning achievement display unit outputs a standard pronunciation video corresponding to some or all of word waveforms whose average values are lower than a reference matching degree, searches for sentence data including the word waveforms in order to improve a matching percentage for each word of each of the output word waveforms, and sends the retrieved sentence data to the output unit; and the data storage unit stores one or more pieces of sentence data.

11. The foreign language learning apparatus of claim 1, further comprising a review unit for outputting previously output word waveforms again when a review request signal is received from the sentence input unit, that is, periodically outputting the word waveforms in a review cycle that corresponds to an Ebbinghaus forgetting curve.

12. A foreign language learning method using a function of reading an input sentence in voice through a Text To Speech (TTS) engine, the foreign language learning method correcting pronunciation through sentence input, comprising the steps of: (a) receiving a first sentence from a user via a sentence input unit; (b) detecting, by a linked letter detection unit, at least one letter corresponding to at least one linking rule by searching letters that form the first sentence received via the sentence input unit; (c) removing, by a linked letter removal unit, the letter corresponding to the linking rule detected by the linked letter detection unit, and generating, by the linked letter removal unit, a second sentence by inserting a linking code into a part from which the letter has been removed; (d) generating, by a partial waveform generation unit, one or more partial waveforms using the TTS engine with respect to a portion from a start point of the second sentence generated by the linked letter removal unit before a part into which the linking code has been inserted, a portion from the part into which the linking code has been inserted before a part into which a subsequent linking code has been inserted, and a portion from the part into which the subsequent linking code has been inserted to an end point of the second sentence; (d) converting, by an input waveform generation unit, a voice corresponding to the first sentence received through the sentence input unit into an input waveform when the voice is received from a user; and (e) calculating, by a matching degree calculation unit, a matching degree by comparing the input waveform generated by the input waveform generation unit with the one or more partial waveforms generated by the partial waveform generation unit, and calculating, by the matching degree calculation unit, a partial matching degree of a part having a highest matching degree in each of the partial waveforms by detecting the part having the highest matching degree while moving from a beginning of the input waveform to an end thereof in an order in which the one or more partial waveforms are disposed, wherein: step (b) comprises the steps of: (b1) detecting, by a word detection unit, an identical word by determining whether or not a word including the letter corresponding to the linking rule is identical with a word previously stored in a data storage unit when the letter corresponding to the linking rule is detected by the linked letter detection unit; and (b2) inserting, by a word waveform insertion unit, a word waveform corresponding to the previously stored word into a part corresponding to the word detected by the word detection unit; the word waveform comprises one or more phonemic waveforms that corresponds to phonemes for respective letters that form the word; the linked letter removal unit removes a phonemic waveform of the part corresponding to the letter that belongs to the letters of the word corresponding to the word waveform and that has been removed by the linked letter removal unit; the partial waveform generation unit generates the one or more partial waveforms using the TTS engine with respect to a portion from the start point of the second sentence generated by the linked letter removal unit to a letter prior to the part into which the word waveform has been inserted, a portion from a letter posterior to the part into which the word waveform has been inserted to a letter prior to a part into which a subsequent word waveform has been inserted, and a portion from a letter posterior to the part into which the word waveform has been inserted to the end point of the second sentence; and the matching degree calculation unit calculates a matching degree by comparing the input waveform generated by the input waveform generation unit with one or more word waveforms generated by the linked letter removal unit and then calculating a word matching degree of a part having a highest matching degree in each of the word waveforms by detecting the part having the highest matching degree while moving from the beginning of the input waveform to the end thereof in the order in which the one or more word waveforms are disposed.

13. The foreign language learning method of claim 12, further comprising steps of: (h) detecting, by a waveform speed calculation unit, a partial waveform or a word waveform corresponding to a highest matching degree of the matching degrees calculated by the matching degree calculation unit, and then calculating, by the waveform speed calculation unit, a comparative speed by comparing a playback length of an input waveform of a corresponding part with a playback length of the partial waveform or the word waveform corresponding to the highest matching degree;

and (i) compressing or extending, by a matching degree re-calculation unit, a total playback length of the input waveform based on the comparative speed calculated by the waveform speed calculation unit, and then calculating, by the matching degree re-calculation unit, the matching degree between each of the partial waveforms or the word waveforms and the input waveform of the corresponding part.

14. The foreign language learning method of claim 12, wherein the linked letter detection unit comprises: a first linking rule in which a letter corresponding to a middle consonant of three consonants is detected if the three consonants are consecutive in one word or two words; a second linking rule in which "p," "t," or "k" is detected if "p," "t," or "k" is placed behind "s"; a third linking rule in which a rearmost consonant of a front word and a foremost vowel of a rear word are detected if the two words are consecutive, the front word ends with a consonant and the rear word starts with a vowel; and a fourth linking rule in which "d" or "t" is detected if "d" or "t" is placed between vowels.

15. The foreign language learning method of claim 12, further comprising step (g) of sending, by a disposition sequence determination unit, a re-input signal to an output unit if the partial matching degree and the word matching degree of the input waveform calculated by the matching degree calculation unit is not identical with a disposition order of the second sentence.

16. The foreign language learning method of claim 12, wherein the data storage unit stores a standard pronunciation video corresponding to each of the word waveforms.

17. The foreign language learning method of claim 12, wherein the matching degree calculation unit calculates a matching percentage for each word by comparing the input waveform with the word waveform on a word basis, calculates a matching percentage for each part by comparing the input waveform with the partial waveform on a partial waveform basis, calculates a matching percentage for each sentence by summing all the matching percentages for each word and all the matching percentages for each part and then dividing each of the sums by a total number of matching percentages for each word and matching percentages for each part, and sends the calculated matching percentage for each word, the calculated matching percentage for each part, and the calculated matching percentage for each sentence to an output unit.

18. The foreign language learning method of claim 17, further comprising step (j) of receiving, by a learning achievement display unit, a standard pronunciation video corresponding to a word waveform whose matching percentage for each word is lower than a predetermined reference matching degree from the data storage unit, and outputting, by the learning achievement display unit, the received standard pronunciation video to the output unit.

* * * * *